Figure 4:
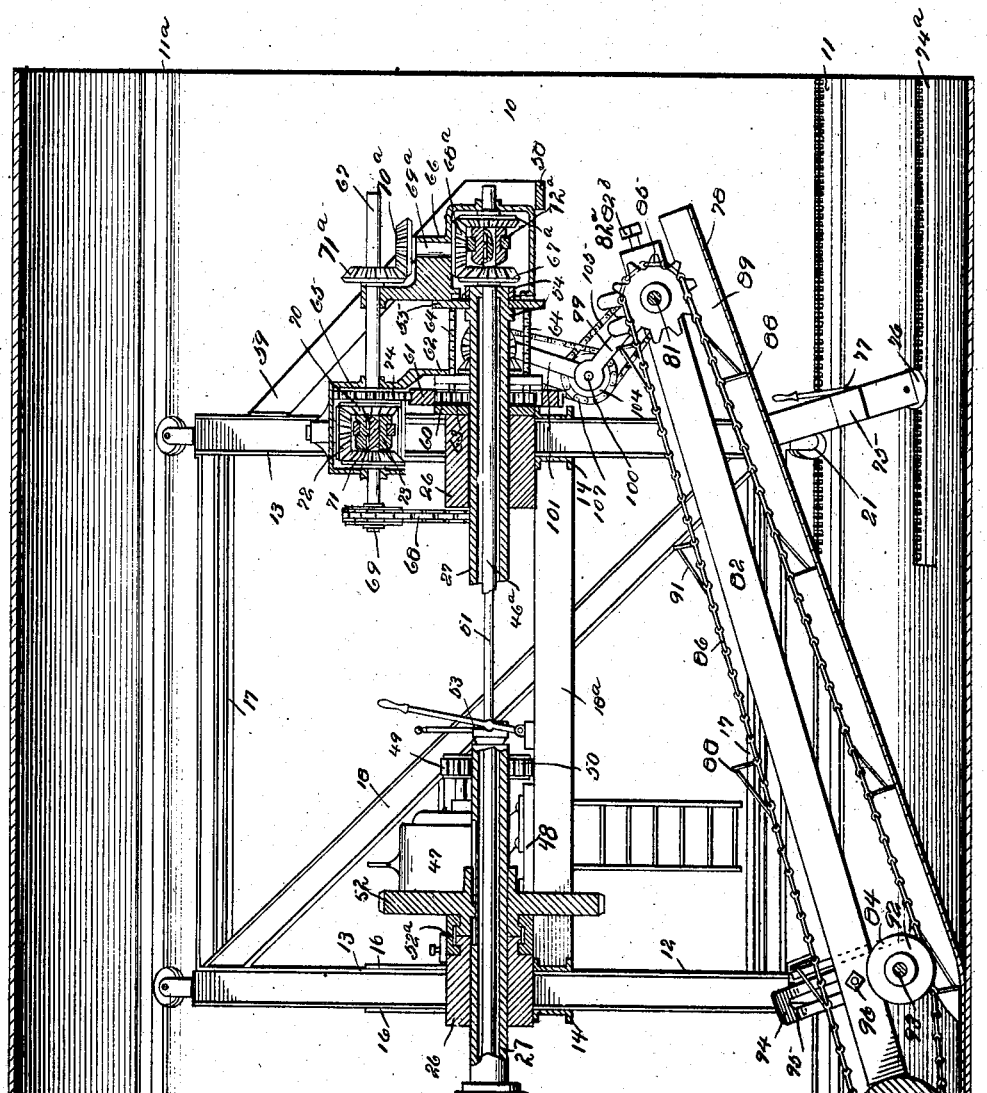

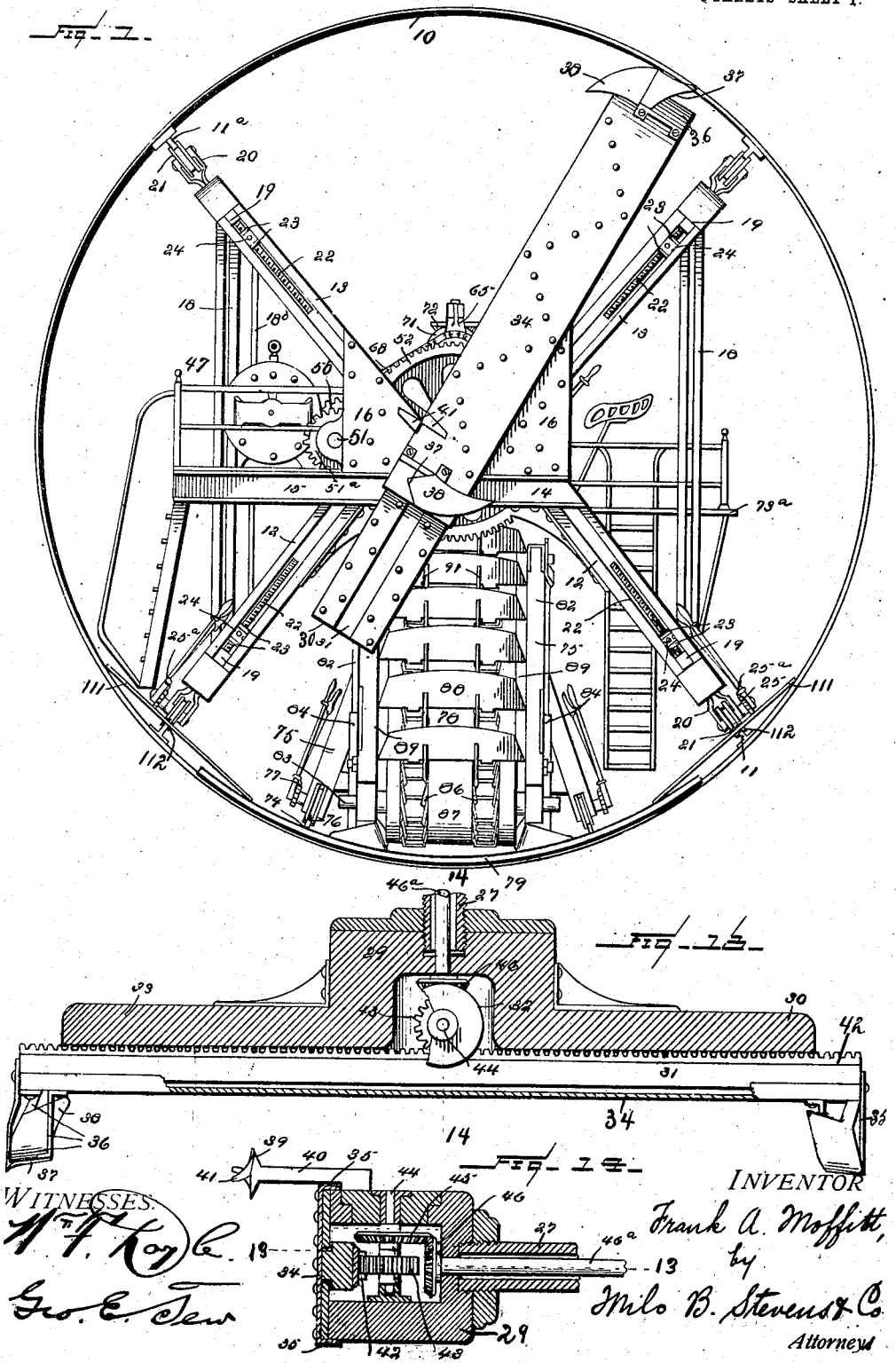

No. 847,801. PATENTED MAR. 19, 1907.
F. A. MOFFITT.
TUNNELING APPARATUS.
APPLICATION FILED MAY 24, 1905. RENEWED SEPT. 4, 1906.

6 SHEETS—SHEET 2.

WITNESSES:
INVENTOR
Frank A. Moffitt,
By Milo B. Stevens & Co.
Attorneys.

No. 847,801. PATENTED MAR. 19, 1907.
F. A. MOFFITT.
TUNNELING APPARATUS.
APPLICATION FILED MAY 24, 1905. RENEWED SEPT. 4, 1906.
6 SHEETS—SHEET 3.
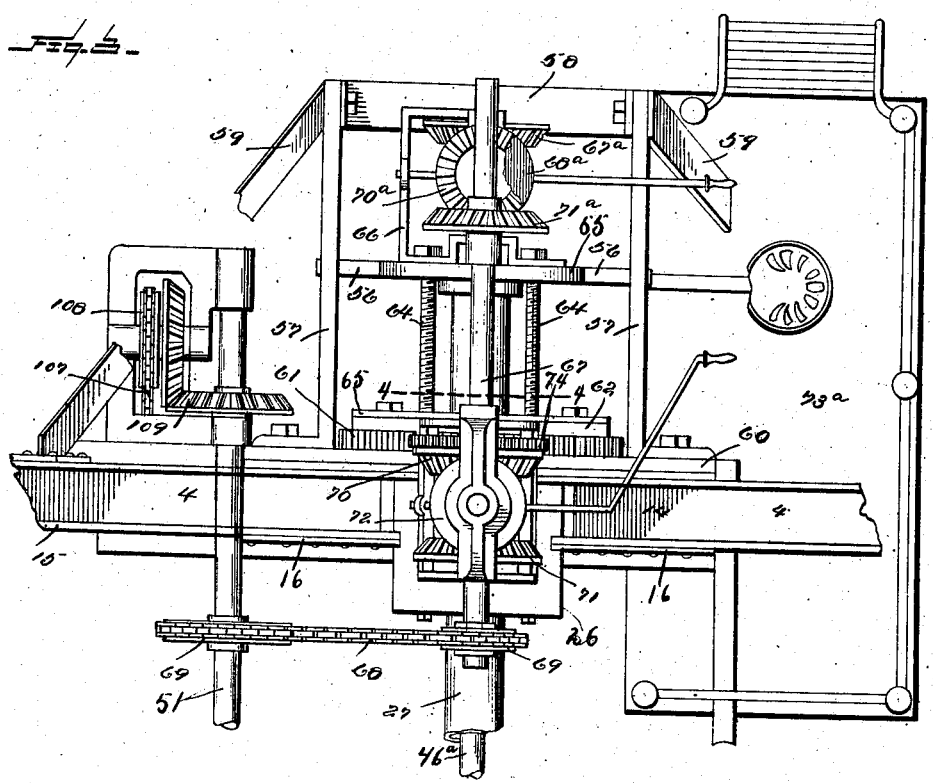
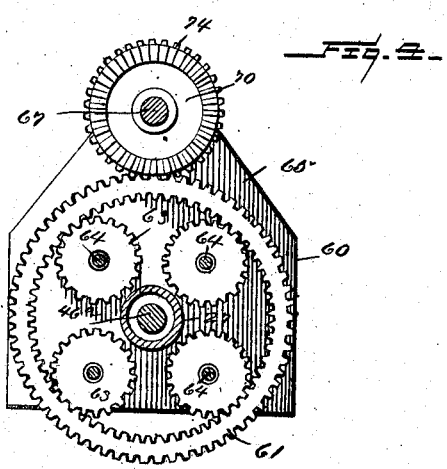
WITNESSES:
INVENTOR
Frank A. Moffitt
BY Milo B. Stevens & Co.
Attorneys.

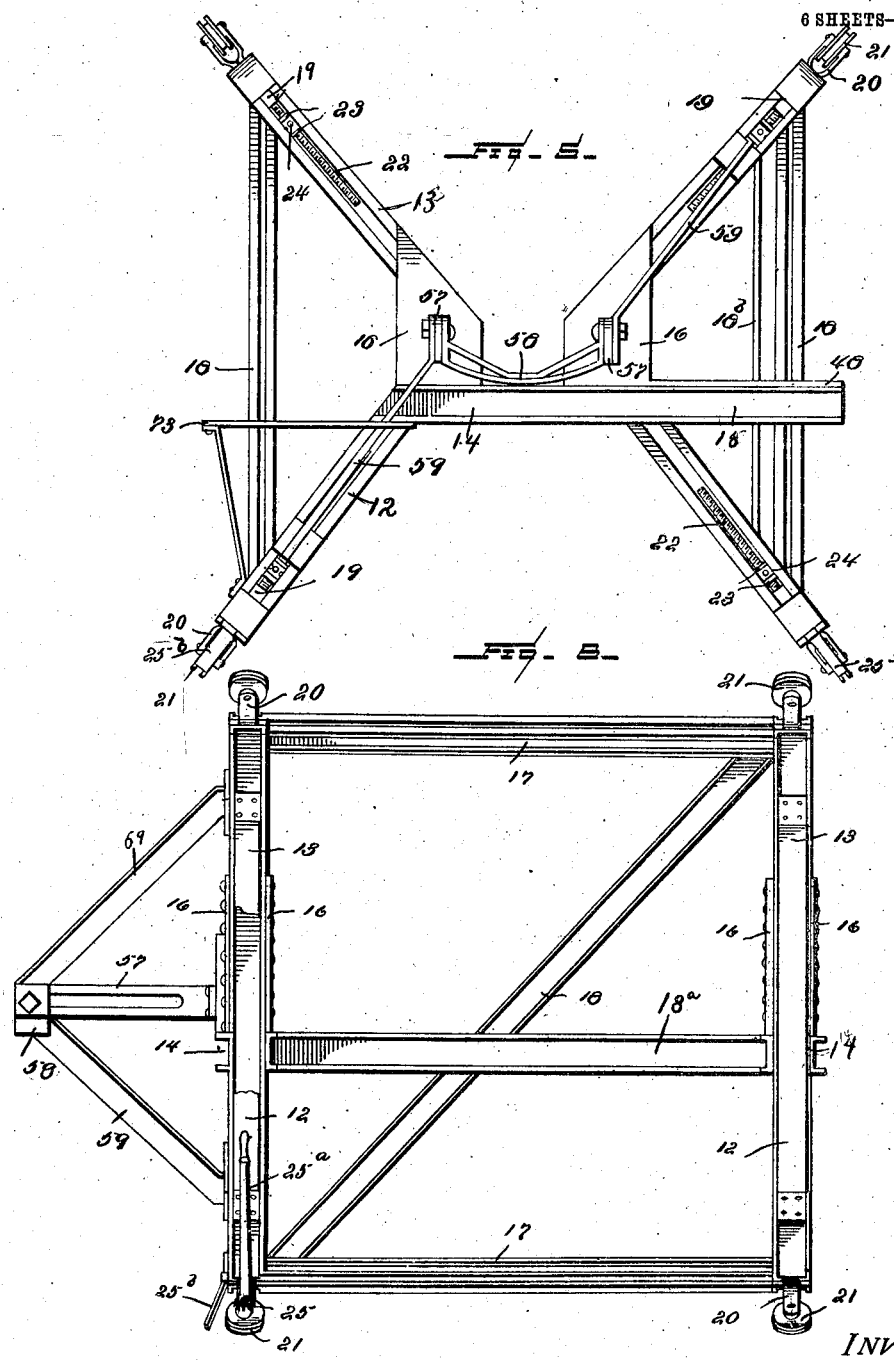

No. 847,801. PATENTED MAR. 19, 1907.
F. A. MOFFITT.
TUNNELING APPARATUS.
APPLICATION FILED MAY 24, 1905. RENEWED SEPT. 4, 1906.
6 SHEETS—SHEET 5.
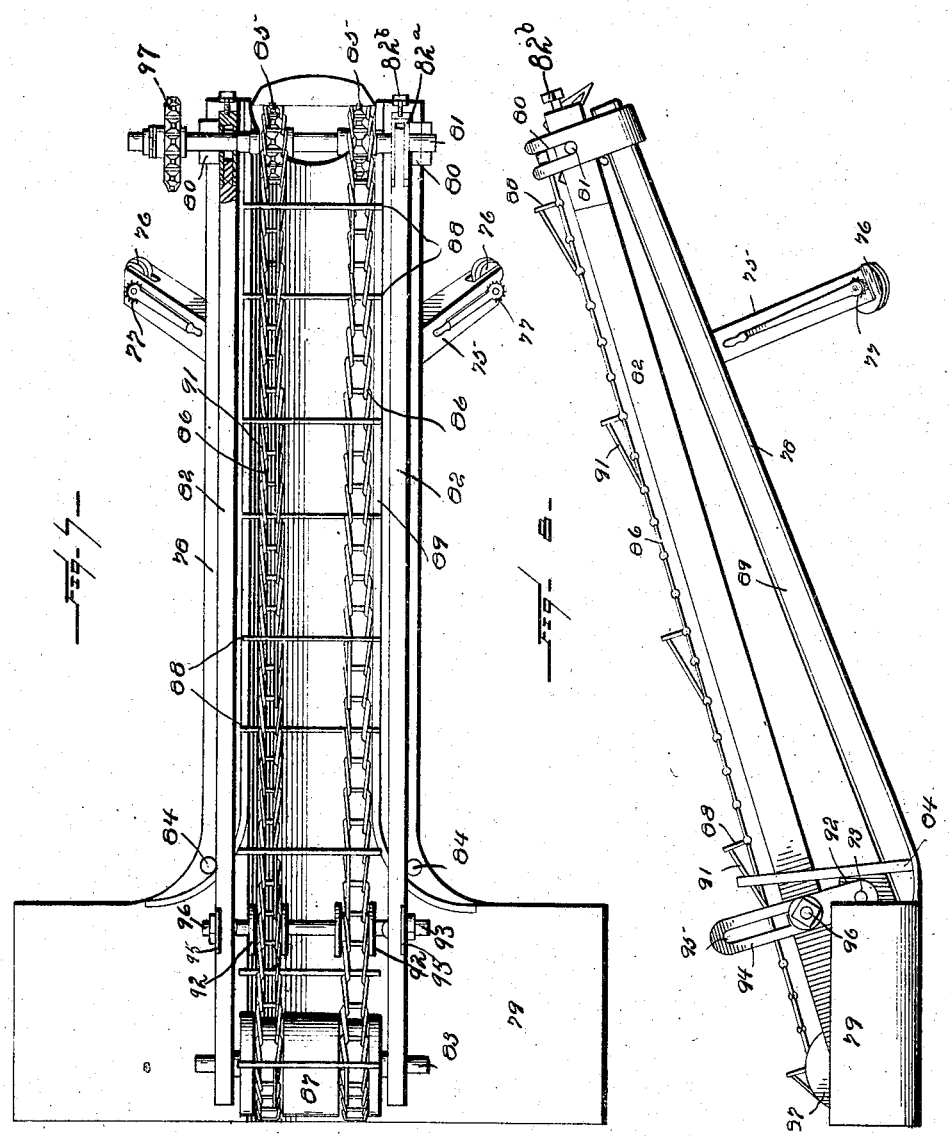
WITNESSES:
INVENTOR
Frank A. Moffitt,
BY Milo B. Stevens & Co.
Attorneys.

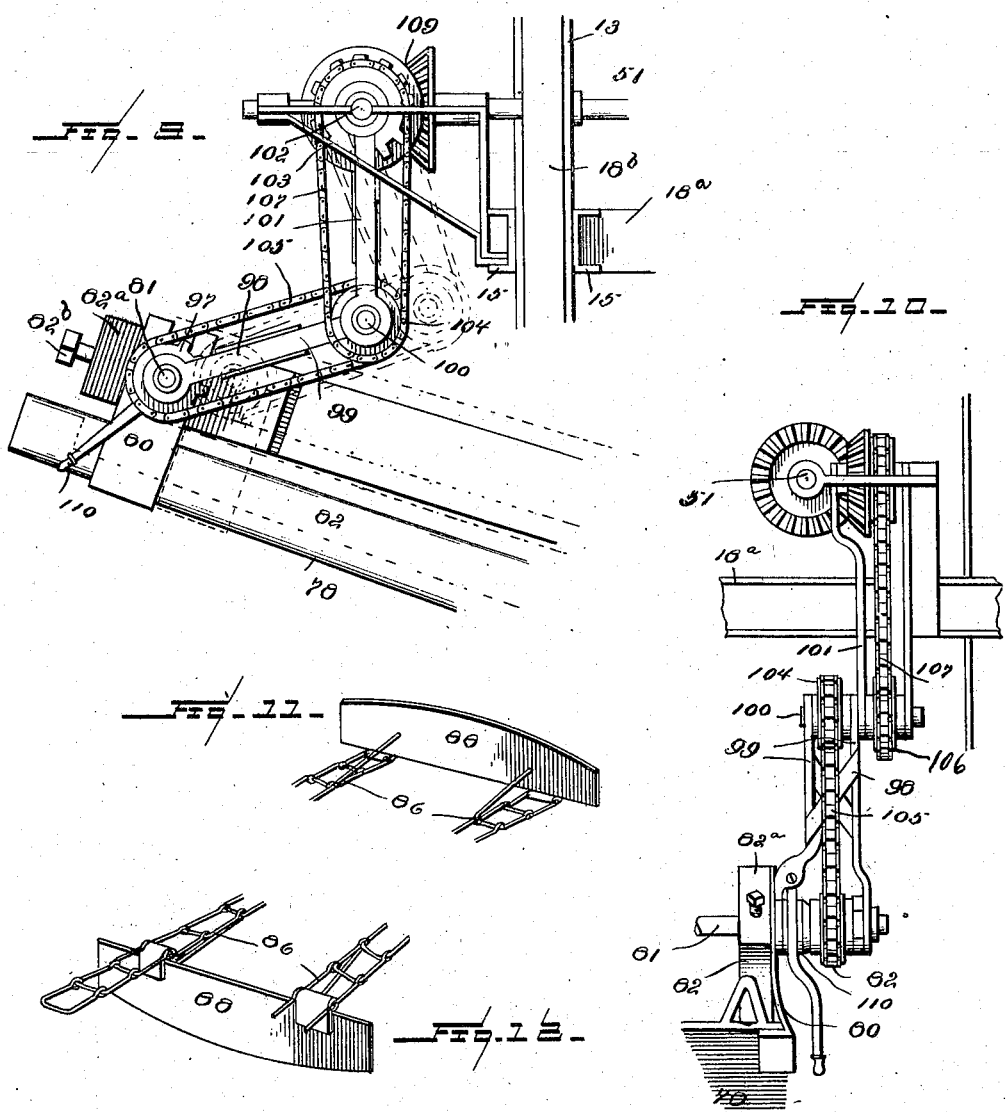

UNITED STATES PATENT OFFICE.

FRANK A. MOFFITT, OF CHICAGO, ILLINOIS.

TUNNELING APPARATUS.

No. 847,801.　　　　Specification of Letters Patent.　　　Patented March 19, 1907.

Application filed May 24, 1905. Renewed September 4, 1906. Serial No. 333,096.

*To all whom it may concern:*

Be it known that I, FRANK A. MOFFITT, a citizen of the United States, and a resident of Chicago, in the county of Cook and State of Illinois, have invented a new and Improved Tunneling Apparatus, of which the following is a full, clear, and exact description.

My invention relates to machines for boring tunnels, and has for its principal object the provision of an efficient apparatus for this purpose.

It consists in the various features and combinations hereinafter described and more particularly claimed.

Reference is to be had to the accompanying drawings, forming a part of this specification, in which similar characters of reference indicate corresponding parts in all the views.

Figure 1 is a transverse section through a tunnel, showing one embodiment of my invention operating therein. Fig. 2 is a central longitudinal vertical section through the apparatus. Fig. 3 is a top plan view of the feed mechanism and more closely associated parts. Fig. 4 is a transverse sectional detail on the line 4 4 of Fig. 3. Fig. 5 is an end elevation of the boring-frame looking from the rear. Fig. 6 is a broken side elevation of said frame. Fig. 7 shows the conveyer mechanism in top plan view. Fig. 8 is a side elevation thereof. Fig. 9 is an enlarged detail, in side elevation, of the gearing connecting the counter-shaft of the boring mechanism with the conveyer mechanism. Fig. 10 is a detail of the same parts in end elevation. Figs. 11 and 12 show in perspective two positions of the conveyer-flights; and Figs. 13 and 14 are sectional details of the boring-head and its more closely associated elements on the line 13 13 and 14 14 of Figs. 14 and 13, respectively.

The numeral 10 designates a shield, which may be of the usual tubular form, having extending longitudinally along its inner wall tracks 11 11, situated near the lower portion of the shield, and tracks 11ª 11ª at the upper portion, these tracks being separated by suitable intervals, preferably substantially ninety degrees. Within the shield is a boring-frame comprising end portions, which are shown as generally X-shaped, each having lower inclined or diagonal members 12 12 and upper inclined members 13 13. The lower members are connected by cross-bars 14, which are extended at one side of each frame at 15 and by plates 16, rising above the cross-bars at opposite sides of the end portions of the frame. These inclined frame members, if extended, would intersect one another; but the point of intersection of the lower members instead of being at the axis of the shield is at a point above said axis, this giving a greater space between the members 12 12 to receive the conveying mechanism, which will be hereinafter described. Near their outer ends the inclined members of the end portions are connected by beams 17, extending substantially parallel to the shield, and by diagonal beams or stays 18, joining the juncture of the members 12 with the connecting-beam 17 and with the similar junctures of the members 13 of the opposite end portion. The cross-bars 14 are shown as joined by longitudinal beams 18ª, and the outer ends of the cross-bars may be stayed by vertical members 18ᵇ, which terminate in the inclined members above and below said cross-bars. All these members, beams, and stays may be connected from channel-irons or like material, they being illustrated as consisting of separated elements joined at suitable points, thus securing lightness and strength. Between these elements at the outer ends of the inclined members 12 and 13 blocks 19 are mounted to slide and carry at their outer sides forks 20, in which are journaled wheels 21, having flanges overlapping the tracks.

From the opposite sides of the blocks threaded rods or stems 22 project inwardly between the elements of the inclined members, they passing through openings in separated plates 23 23, fixed to said members. Between these plates and coöperating with the threads of the stem are nuts 24, which are shown as provided with peripheral openings to receive a suitable wrench or bar, this facilitating the turning of the nuts, thus moving the wheels toward and from the tracks to effect proper engagement. The tracks 11 are toothed or in the form of racks, and the coöperating wheels have similar teeth situated between their flanges. The axles of the rear wheels have fast upon them ratchet-wheels 25, with which coact ratchet-levers 25ª. By oscillating these levers the rear wheels are rotated, and the engagement of their teeth with the track-teeth serves to advance or withdraw the boring-frame in the shield. Pivoted upon the lower extremity of each of the rear members 12, just above the tracks, are dogs 25ᵇ, which when swung down wardly will engage the track-teeth and hold the frame against rearward movement.

Above the bars 14 and between the members 13 are mounted bearings 26. In these bearings is journaled a hollow boring-shaft 27, which carries at its forward end a head 29, provided with oppositely-extending transverse arms 30 30. Across the head, in the outer face of these arms, is a way 31, and from this way into the head opens a central recess 32. Mounted to slide in the way is a boring-bar 33, which has fast upon its outer side a plate 34, which extends beyond the sides of the head-arms and has flanges 35 overlapping them. Supported near the outer ends of the bar by arms 36, engaging it and the plate, are cutters 37, having forward operating edges, from which extend inwardly and rearwardly curved portions 38 to deflect the material removed by the cutting edges toward the center of the shield, the plate and its flanges preventing this from entering the way in which the bar slides. The distance between the cutters is preferably greater than the radius of the shield, so that they may operate from a circumference just outside the shield to one in proximity to the center. The space between them which could not be covered by their transverse movement is operated upon by a cutter 39, having a shank 40 fixed to one side of the head just within the plate-flange and furnished at its forward end with oppositely-projecting blades 41 41. To the inner side of the boring-bar is secured a rack 42, with which meshes a pinion 43, fast upon a shaft 44, extending transversely of the head and being situated within the recess 32. This shaft has also secured upon it a bevel-gear 45, which meshes with a similar gear 46, fixed to the extremity of a shaft 46ª, which extends through the shaft 27, it being journaled at the ends thereof. This shaft 46ª is rotatable in opposite directions by mechanism which will be later described.

The boring-shaft is rotated to produce the cut by a motor 47, preferably electric, supported upon a platform 48, which is carried by the beams 18ª. The weight of this motor, situated considerably at one side of the axis, serves to counterbalance the thrust of the cutters, avoiding the bringing of a strain upon the tracks and the tendency to turn the shield. Upon the motor-shaft is a pinion 49, meshing with a gear 50 upon a counter-shaft 51, which extends through the shield at one side of the boring-shaft, conveniently having bearings in the plates 16. The counter-shaft also has fixed upon it a gear 51ª, which engages a large gear 52, which is splined upon the shaft so that longitudinal movement of the latter is permitted, the gear itself being held against such movement by a flanged collar 52ª, coöperating with the forward bearing-block 26. Included in the gearing between the motor and the boring-shaft is shown a friction-clutch 53, by which the boring mechanism may be thrown into or out of operation.

Surrounding the rear end of the boring-shaft between collars 54 54, carried thereby, is a feed-plate 55, having opposite extensions 56, lying between guides 57, which project outwardly from the rear plate 16. These guides may be stayed and strengthened by a cross-brace 58, connecting them, and by inclined braces 59, which extend to the diagonal frame members. Surrounding the boring-shaft adjacent to the rear plate 16 is a bearing-plate 60, which holds against movement in this direction a gear-ring 61, maintained against outward displacement by a yoke 62, fixed to the bearing-plate. This gear-ring is provided with internal and external teeth, the former meshing with what is here illustrated as four pinions 63, each of which has at its center a threaded opening to receive threaded rods or screws 64, movable at their inner ends through the yoke and bearing-plate and fixed at their outer extremities to the feed-plate. Journaled in a frame 65, supported by the yoke, and in a frame 66, fixed to the feed-plate and surrounding the outer end of the shaft 46ª, where it extends rearwardly beyond the boring-shaft, is a counter feed-shaft 67, driven by a chain 68, passing over sprocket-wheels 69 69, secured to it and to the main counter-shaft 51. Within the frame 65 about the shaft 67 are oppositely-situated and normally loose bevel-gears 70 and 71, with both of which meshes a bevel-pinion 72, rotatably mounted in the upper portion of the frame. Either of these gears 70 and 71 may be caused to rotate with the shaft by a friction-clutch 73, splined upon and movable along it. Carried by the bevel-gear 70 is a spur-gear 74, meshing with the external teeth of the ring 61. When the friction-clutch is in its intermediate position, the counter feed-shaft will turn idly in the bevel-gears; but if it is in engagement with one of said gears the spur-gear 74 will be turned in one direction or the other, rotating the gear-ring, which in turn will rotate the pinions 63, causing them to move the threaded rods longitudinally, and thus advance or retract the feed-plate and similarly move the boring-shaft to bring the cutters into engagement with the surface operated upon or to withdraw them.

Upon a projecting portion of the shaft 46ª within the frame 66 are loosely mounted opposed bevel-gears 67ª 67ª, with which meshes an intermediate bevel-gear 68ª, fixed upon a vertical shaft 69ª, journaled in the frame. This shaft 69ª has secured upon its upper end a bevel-gear 70ª, engaging a similar gear 71ª upon the shaft 67. A friction-clutch 72ª may be brought into engagement with either of the gears 67, causing the feed-shaft 46ª to rotate either right or left handedly. This, acting through the gearing in the head of the boring-shaft, will reciprocate the boring-bar, causing the cutters to travel across the face operated upon from the exterior of the shield to points in proximity to the center or within the range of the cutter 39. Mounted upon the rear portion of the frame adjacent to the controlling mechanism, so that the clutch-levers may be readily reached therefrom, is a platform 73ª for the support of an operator.

At the bottom of the shield between the tracks 11 11 are preferably toothed parallel tracks 74ª 74ª, upon which is supported a frame 75, having toothed wheels 76, meshing with the track-teeth. With these wheels are associated ratchet mechanism 77 to effect their rotation to advance and withdraw this frame in the same manner as those connected with the boring-frame hereinbefore described. Extending from points at the rear of this frame 75 forwardly is a downwardly-inclined table 78, having at its outer extremity an apron 79, which conforms in curvature to the shield and may substantially cover the space between the tracks 11. From the rear of the table rise opposite slotted standards 80 80, in which is journaled a shaft 81. About this shaft may swing side bars 82 82, which may have longitudinal slots through which the shaft extends. A bearing-plate 82ª also surrounds the shaft at each side bar, these straddling the ends of the bars and having adjusting-screws 82ᵇ contacting therewith. The side bars are connected at their forward extremities by a shaft 83, journaled in them and retained against lateral displacement by posts 84, extending upwardly from the table near the apron portion. Upon the shaft 81 between the standards is a pair of sprocket-wheels 85 85, over which pass endless members or chains 86, supported at their forward ends by a grooved drum 87, fixed upon the shaft 83. Upon alined links of these chains are secured flights 88, separated at suitable intervals and running over the table between side walls 89. Each flight is preferably connected by links or stays 91 with chain-links in advance of those to which they are secured. This causes the flights as they turn the drum at their forward extreme of movement to be brought quickly to a vertical position, so that they effectively contact with the apron to move over it and up the table material which has been deposited thereon by the cutters. With the under runs of the conveyer-chains coact pulleys 92, carried by a shaft 93, journaled in brackets 94. These brackets are preferably slotted at 95 and attached by bolts 96 to the outer faces of the side bars, this arrangement permitting a movement of the pulleys to bring the flights into the proper relation with the table. The pivoting of the conveyer side bars causes the flights upon these lower runs to operate always in close proximity to the apron and table, and by turning the screws 82ᵇ the tension of the chains may be varied independently of the pulleys 92.

Upon the shaft 81 is secured a sprocket-wheel 97, which is surrounded by a frame 98, comprising side members 99 99, which may be connected by cross-bars. This frame is pivoted upon the end of the shaft, and in its outer extremity is journaled a shaft 100, which has movable about it a frame 101, similar to the companion frame. The outer end of the frame 101 is pivoted upon a shaft 102, rotatable in a frame 103, carried upon the counter-shaft 51. The sprocket-wheel 97 is connected to a sprocket-wheel 104, fast upon the shaft 100, by a chain 105. This shaft 100 also has fixed upon it a sprocket-wheel 106, both of these wheels being rotatable between the separated elements of the pivoted frames. Over the sprocket-wheel 106 and a sprocket-wheel 108, secured upon the shaft 102, passes a chain 107. This shaft is connected by bevel-gearing 109 with the counter-shaft, this chain of gearing serving to transmit movement to the conveyer and the pivoted frames allowing this to be effected in all positions of the conveyer-table without interfering with the operation. A friction-clutch 110 may be included in this gearing to allow the conveyer to be thrown into and out of action.

The forward end of the shield is applied to the face to be operated upon in the usual manner and the boring-frame advanced along its tracks by the ratchet mechanism until the cutters of the boring-bar are in contact with the face in the inmost position of the head. The conveyer mechanism is also similarly positioned with its apron beneath the cutters. To prevent the material thrown upon this apron from falling upon the lower tracks and lodging, shields 111 may be applied to the tracks, these having flanges 112 engaging the tracks. The lower ends of the shields overlap the apron and direct material upon it. The motor-clutch and the conveyer-clutch being in the proper position to transmit power to the boring mechanism and conveyer mechanism, the clutches 73 and 72ª are thrown in to produce a forward feed of the boring-shaft and a transverse feed of the boring-bar in one direction, this causing one of the cutters to be moved, for example, from the periphery of the shield toward the center, while its companion travels from the center toward the opposite side of the periphery, removing spiral portions of the material and operating over the entire face within the shield except at the center, where the cutter 39 acts. After the bar has reached its extreme of movement in this direction the clutch 72ª is moved into contact with the other gear, reversing the travel of the feed-bar and causing it to produce a second cut. This continues until the boring-shaft has been advanced to its maximum extent, when the clutch 73 is reversed to withdraw the head. The shield may now be jacked into the opening which has been formed to repeat the operation. During the cutting the dislodged material falls upon the apron and sliding down its sides to the center comes in contact with the flights of the conveyer, which move it up the table between the side walls and over the upper end, where it may be received by a suitable car. The independent movement of the conveying mechanism allows it to be advanced into the cut beyond the shield, so that its apron may always occupy the proper position beneath the rotating bar. It will be seen that by the use of friction-clutches for connecting and controlling the operating mechanisms the danger of bringing destructive stresses upon the elements will be avoided in case the moving parts strike unduly hard substances, as the clutch members may slip in such cases. The cutters here illustrated are particularly adapted for operating upon clay; but it will be obvious that their form may be varied to suit different conditions.

Having thus described my invention, I claim as new and desire to secure by Letters Patent—

1. A tunneling apparatus comprising a rotatable shaft, a head mounted thereon, and a bar provided with cutters and being movable in the head transversely of the shaft, the cutters being rigid with the bar and on opposite sides of the axis of the shaft, so that the transverse movement causes one cutter to approach and the other to recede from the center.

2. A tunneling apparatus comprising a rotatable shaft, a head mounted thereon and having a groove, and a bar provided with cutters and being movable in the groove, the cutters being rigid with the bar and on opposite sides of the axis of the shaft, so that the transverse movement causes one cutter to approach and the other to recede from the center.

3. A tunneling apparatus comprising a rotatable shaft, a head mounted thereon and having a groove, a bar provided with cutters and being movable in the groove, and a plate secured to the bar and extending over the head.

4. A tunneling apparatus comprising a rotatable shaft, a head mounted thereon and having a groove, a bar provided with cutters and being movable in the groove, and a plate secured to the bar and extending over the head and having flanges overlapping the sides of the head.

5. A tunneling apparatus comprising a rotatable shaft, a head mounted thereon, a bar provided with cutters and being movable in the head transversely of the shaft, a feed-shaft, and gearing connecting the bar and feed-shaft and arranged to move the bar transversely as the head rotates.

6. A tunneling apparatus comprising a hollow boring-shaft movable lengthwise, a head mounted thereon, a bar provided with cutters and being movable upon the head, a feed-shaft extending through the boring-shaft, and gearing connecting the feed-shaft and bar.

7. A tunneling apparatus comprising a hollow boring-shaft, a head mounted thereon, a bar provided with cutters and being movable upon the head, a rack fixed to the bar, a pinion journaled upon the head and meshing with the rack, and gearing connecting the feed-shaft and pinion.

8. A tunneling apparatus comprising a hollow boring-shaft, a head mounted thereon, a bar provided with cutters and being movable upon the head, a feed-shaft extending through the boring-shaft, gearing connecting the feed-shaft and bar, oppositely rotatable gears mounted upon the feed-shaft beyond the boring-shaft at the end opposite the bar, and a clutch which may coact with either of said gears.

9. A tunneling apparatus comprising a rotatable and longitudinally-movable shaft, cutters mounted thereon, a feeding-plate cooperating with the shaft, screws projecting from the feeding-plate, pinions having threaded openings to receive the screws, and means for rotating the pinions.

10. A tunneling apparatus comprising a rotatable and longitudinally-movable shaft, cutters mounted thereon, a feeding-plate cooperating with the shaft, screws projecting from the feeding-plate, pinions having threaded openings to receive the screws, a gear-ring provided with internal teeth meshing with the pinions and also provided with external teeth, and gearing engaging the external teeth.

11. A tunneling apparatus comprising a rotatable and longitudinally-movable shaft, cutters mounted thereon, a feeding-plate cooperating with the shaft, a plurality of screws projecting from the feeding-plate, pinions having threaded openings to receive the screws, a gear-ring provided with internal teeth meshing with all of the pinions and also provided with external teeth, and gearing engaging said external teeth.

12. A tunneling apparatus comprising a rotatable and longitudinally-movable shaft, cutters mounted thereon, a feeding-plate cooperating with the shaft, screws projecting from the feeding-plate, pinions having threaded openings to receive the screws, a gear-ring provided with internal teeth meshing with the pinions and also provided with external teeth, oppositely-rotatable gears, one of which engages the external teeth, and a clutch which may coact with either of said gears.

13. The combination with a shield, of a boring-shaft rotatable therein, a bar movable transversely of the boring-shaft, and cutters mounted upon the bar and being separated by a distance greater than the radius of the shield.

14. The combination with a shield, of a boring-shaft rotatable therein, a bar movable transversely of the boring-shaft, cutters mounted upon the bar and being separated by a distance greater than the radius of the shield, and an intermediate cutter rotatable with the shaft and being mounted independently of the bar.

15. The combination with a shield, of tracks extending longitudinally thereof, a frame, blocks movable in the frame, wheels carried by the blocks, threaded stems extending from the blocks, and nuts operating upon the stems and coacting with the frame.

16. The combination with a shield, of a boring-frame supported therein and comprising inclined members converging toward a point at one side of the center of the shield, and conveying mechanism carried in the space between the inclined members.

17. The combination with a shield, of a movable boring-frame supported therein, an independently-movable frame situated within the shield, and conveying mechanism carried by the last-named frame.

18. The combination with a shield, of tracks extending longitudinally thereof, a boring-frame movable upon the tracks, tracks situated between those first named, and a conveying-frame movable upon these intermediate tracks.

19. The combination with a shield, of a frame comprising separated generally X-shaped portions, a boring-shaft journaled near the intersections of the X-shaped portions, bars extending from the frame at one side of the shaft, and a motor supported upon the bars.

20. The combination with a shield, of a movable boring-frame and a movable carrier-frame situated therein, a shaft journaled in each of the frames, a frame pivoted upon each of the shafts and to one another, and gearing carried by the shafts and connected frames.

In testimony whereof I have signed my name to this specification in the presence of two subscribing witnesses.

FRANK A. MOFFITT.

Witnesses:
SIGNA FELTSKOG,
H. G. BATCHELOR.